(12) United States Patent
Landais et al.

(10) Patent No.: US 10,239,601 B2
(45) Date of Patent: Mar. 26, 2019

(54) METHOD AND DEVICE FOR FIREPROOFING A PART IN COMPOSITE MATERIAL

(71) Applicant: DAHER AEROSPACE, Saint Julien de Chedon (FR)

(72) Inventors: Fabrice Landais, Romain sur Cher (FR); Dominique Soubelet, Amboise (FR)

(73) Assignee: DAHER AEROSPACE, Saint Julien de Chédon (FR)

( * ) Notice: Subject to any disclaimer, the term of this patent is extended or adjusted under 35 U.S.C. 154(b) by 0 days.

(21) Appl. No.: 15/556,300

(22) PCT Filed: Mar. 16, 2016

(86) PCT No.: PCT/EP2016/055742
§ 371 (c)(1),
(2) Date: Sep. 7, 2017

(87) PCT Pub. No.: WO2016/146716
PCT Pub. Date: Sep. 22, 2016

(65) Prior Publication Data
US 2018/0043983 A1    Feb. 15, 2018

(30) Foreign Application Priority Data
Mar. 16, 2015 (FR) ..................... 15 52080

(51) Int. Cl.
*B64C 1/40* (2006.01)
*A62C 3/08* (2006.01)
*B64C 1/00* (2006.01)
*B64D 45/00* (2006.01)
*A62C 2/06* (2006.01)

(52) U.S. Cl.
CPC ............... *B64C 1/40* (2013.01); *A62C 3/08* (2013.01); *A62C 2/06* (2013.01); *B64C 2001/0072* (2013.01); *B64D 2045/009* (2013.01); *Y02T 50/43* (2013.01)

(58) Field of Classification Search
CPC ..... B32B 2307/3065; A62C 3/08; A62C 2/06; B64C 1/40; B64C 1/403
See application file for complete search history.

(56) References Cited

U.S. PATENT DOCUMENTS

| | | | | |
|---|---|---|---|---|
| 4,767,656 A | * | 8/1988 | Chee | B32B 3/12 428/116 |
| 4,952,440 A | * | 8/1990 | Sanmartin | F16L 59/029 428/116 |
| 2012/0227370 A1 | * | 9/2012 | Mickelsen | A62C 3/08 60/39.11 |

FOREIGN PATENT DOCUMENTS

| | | |
|---|---|---|
| EP | 0167533 B1 | 2/1990 |
| FR | 2 640 738 A1 | 6/1990 |
| FR | 2 690 106 A1 | 10/1993 |

* cited by examiner

*Primary Examiner* — Scott W Dodds
(74) *Attorney, Agent, or Firm* — Im IP Law; C. Andrew Im; Chai Im

(57) ABSTRACT

A device for fireproofing a section of a structural part made of composite material. The device includes a skin having an outer surface configured to face the flame and an inner surface. The skin is made of composite material that includes fibrous reinforcement in a polymer matrix. The skin includes a fastener to fasten the part to the structure. The device includes a layer of needled mineral felt placed between the inner surface of the skin and a surface of the structural part.

3 Claims, 1 Drawing Sheet

METHOD AND DEVICE FOR FIREPROOFING A PART IN COMPOSITE MATERIAL

RELATED APPLICATIONS

This application is a § 371 application from PCT/EP2016/055742 filed Mar. 16, 2016, which claims priority from French Patent Application No. 15 52080 filed Mar. 16, 2015, each of which is incorporated herein by reference in its entirety.

FIELD OF THE INVENTION

The invention relates to a method and device for fireproofing a part in composite material. The invention is more particularly but not exclusively intended for the field of aeronautics, for fireproofing a structural part made of composite material with fiber reinforcement in a thermoplastic or thermosetting polymer matrix.

BACKGROUND OF THE INVENTION

Structural aircraft parts located in areas that are potentially exposed to flames need to be fire resistant under a regulatory obligation. The standards require minimum resistance for 15 minutes from a part exposed to a flame at 1100° C. combined with vertical vibration with 0.4 mm amplitude and 50 Hz frequency. "Fire resistance" qualification is defined by the achievement of different performance levels, which correspond to standards or the internal requirements of the aircraft manufacturer, namely:
- no overrun of critical self-ignition temperatures of the structure during its degassing phase;
- the temperature on the face of the structure opposite the face exposed to the flame may not exceed 500° C. after 5 minutes of exposure, and 700° C. after 10 minutes of exposure;
- exposure to an energy flow of 120 kW*m$^{-2}$ may not perforate the structure during the first 10 minutes of exposure.

To that end, different protection techniques are used. The document EP 0167533 provides a view of the protection techniques of the prior art.

These different protection techniques of the prior art have the drawbacks of making a significant addition of mass, as the specific gravity of the protective means is greater than that of the structural part, and of not following the shape of the part. Further, the coverings used to protect the parts according to the methods of the prior art have the drawback of being sensitive to perforation and tearing, and such degradation of said covering leads to a loss of efficiency of the covering in respect of fire protection. In order to remedy that drawback, a solution of the prior art consists in protecting the thermal insulation with metal shells. Beyond the significant addition of mass resulting from this solution, the metal shell tends to deform and dilate thermally in a different way from the structure, which makes it difficult to fix it to said structure and results in significant mechanical constraints in the structure when the metal shell is exposed to a flame, or even during temperature variations that occur in service. 0.08 mm thick sheets of stainless steel are commonly used for that purpose. The mass added by these sheets is about 1.270 kg*m$^{-2}$, while the fine thickness of said sheets only offers moderate mechanical protection to the underlying protective covering and is sensitive to perforation. Thus, when the underlying protective covering has a surface density of about 1 kg*m$^{-2}$, the mass added by that protective solution of the prior art is about 2.270 kg*m$^{-2}$.

OBJECT AND SUMMARY OF THE INVENTION

The invention aims to remedy the drawbacks of the prior art and therefore relates to a device for fireproofing a section of a structural part made of composite material, characterized in that it comprises:
a. a skin, comprising an outer surface intended to face the flame and an inner surface, which skin is made of composite material that comprises fibrous reinforcement in a polymer matrix and comprises means to fasten the part to the structure;
b. a layer of needled mineral felt placed between the inner surface of the skin and a surface of the structural part.

Thus, the skin is suitable to be formed using conventional techniques for working with composite materials with polymer matrices, and can be adapted precisely to the shape of the section of the part to protect. It protects the thermal insulation, that is to say the needled felt, from mechanical attacks and the addition of mass remains moderate. Said skin is sufficiently flexible in relation to the rigidity of the structure to enable it to follow the deformations of the structure and its thermal dilatation is of the same amplitude as that of the structure protected in that way.

The invention can be implemented advantageously in the embodiments described below which may be considered individually or in any technically operative combination.

Advantageously, the mineral felt is about 10 mm thick. That thickness, combined with the protection granted by the composite skin, is sufficient to offer thermal protection to the structural part with a moderate addition of mass.

In one embodiment, the fastening means comprise rivets.

In another embodiment, compatible with the previous one, the fastening means comprise gluing between the skin and the structural part.

Advantageously, the fastening means combine gluing with glue that withstands temperature above or equal to 200° C. and riveting. Thus, gluing offers sealed protection to the structural part at the degassing temperatures, and the rivets hold the thermal protection on the structure at higher temperatures.

Advantageously, the skin comprises a ply made of glass fabric on its inner surface. Said glass fabric protects the felt from the flame.

The invention also relates to a method for protecting a structural part using a device according to the invention, which method comprises the steps of:
i. laying up a ply of non-impregnated glass on a tool corresponding to the shape of the section of the structural part, but offset by the thickness of the insulating felt, which ply of dry glass is on the inner surface of the skin;
ii. laying up a ply of pre-impregnated glass on the ply of non-impregnated glass applied in step (i);
iii. curing the laminate thus obtained so as to form a skin;
iv. placing a thickness of fire retardant felt on the inner surface of said skin;
v. fixing said skin to the section of the structural part;
vi. repeating operations (i) to (v) for each section of the structural part until said structural part is covered.

Thus, application by laying up, curing and consolidating the skin makes it possible to adapt the shape of the skin to the part to protect.

Advantageously, step (iv) of fixing the skin of the method according to the invention comprises a riveting operation and the method comprises a step of:

vii. applying thermal protection of the ablative or intumescent type on the rivet heads.

Thus, the rivet heads are protected from the temperature and the rivets do not transmit the flame inside the skin.

BRIEF DESCRIPTION OF THE DRAWINGS

The invention is described below in its preferred embodiments, which are not imitative in any way, and by reference to FIGS. 1 to 2, wherein.

DETAILED DESCRIPTION OF THE EMBODIMENTS

Figure 1:
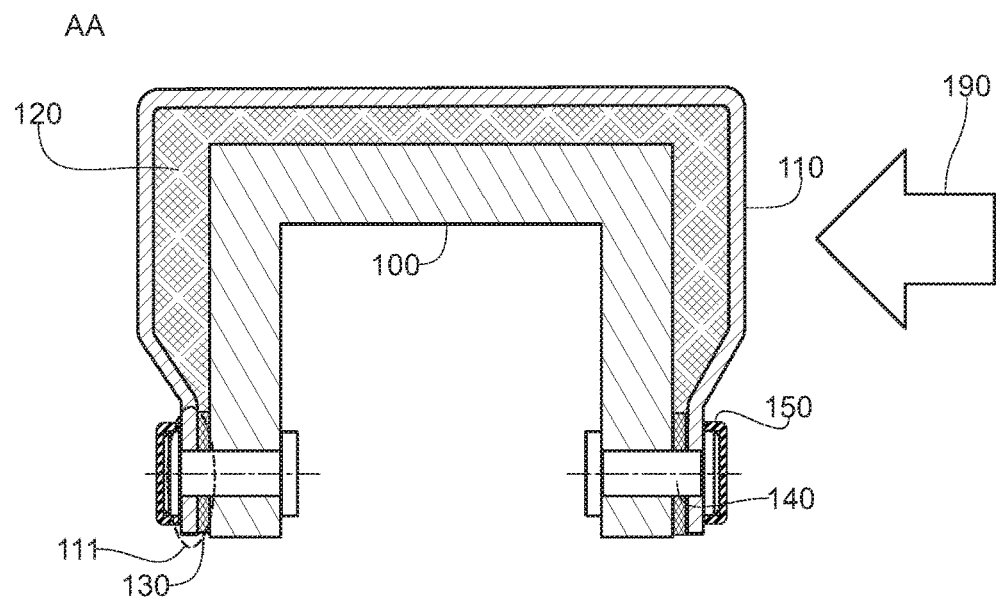
FIG. 1 is a schematic profile view along a section AA defined in FIG. 2 of an exemplary embodiment of the protective device according to the invention.

In FIG. 1 of an exemplary embodiment, the fireproofing device according to the invention is adapted for protecting a structural part (100), particularly made up of laminated composite material with fibrous reinforcement in a polymer matrix. Said device comprises a skin (110) forming an enclosing shell around a section of said part (100). That skin (110) is semi-rigid and is made up, in one exemplary embodiment, of laminated composite material with fibrous reinforcement in a thermosetting or thermoplastic polymer matrix. As a non-limitative example, said laminate that makes up the skin comprises two plies of a glass fabric in epoxy resin. In this exemplary embodiment, the skin is made by laying up said two plies on a tool, wherein one of the plies is dry and the other pre-impregnated. The outer surface of the skin is exposed to the flame. While laying up, the ply of dry glass is placed on the inner surface. Then the skin is conventionally compacted and cured. The forming tool of the skin reproduces the exact shape of the section of the protected part (100), including any bosses (212) as shown in FIG. 2.

Thermal insulation (120) is placed between the inner surface of the skin (110) and the part (100). In an exemplary embodiment, said insulation is made of needled quartz fibers with a thickness of 10 mm. In this configuration, the surface density of the thermal insulation is about 1 $kg*m^{-2}$.

In an exemplary embodiment, the skin is attached to the part by gluing, using silicone glue (130) that resists temperature of at least 200° C., and using rivets (140). To that end, the skin (110) comprises fastening portions (111) provided in the laying up tool. The flexibility of the skin enables it to adapt to the shape of the part and ensures close contact between said part and the assembly portions (111) so that the volume enclosed by the skin is sealed. The rivet heads are protected by thermal protection covering (150) of the ablative or intumescent type, for example ablative covering distributed under the trademark FASTBLOCK® 800 by Esterline. The combination of gluing and riveting makes it possible to secure the skin as close to the contour of the part as possible, including in the connecting radius zones, where rivets cannot be installed. In this exemplary embodiment, the overall mass added is 1.7 $kg*m^{-2}$, that is to say 25% less than the solution of the prior art using metal protective sheets.

Figure 2:
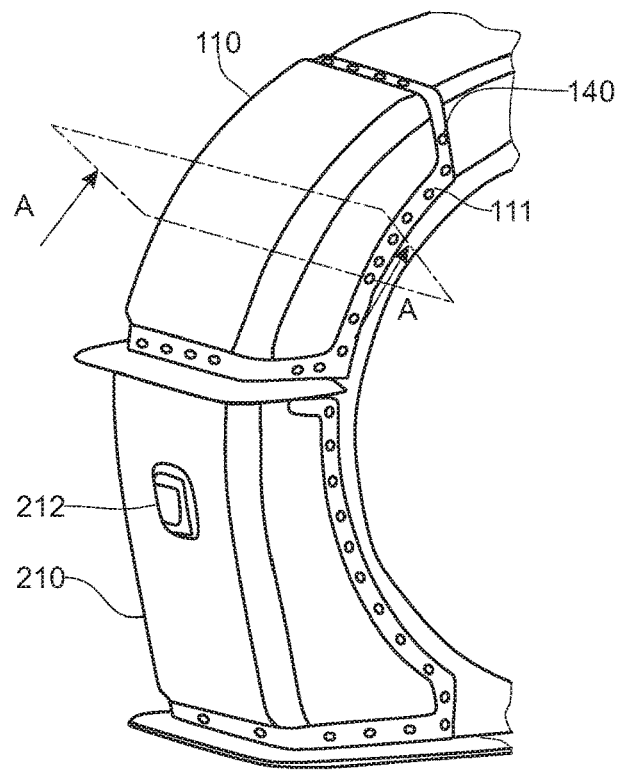
FIG. 2 is a perspective view of an exemplary embodiment of two sections of the thermal protection on a part.

In FIG. 2, the surface of the part (100) liable to be exposed to flames is covered, in sections, by a plurality of devices (110, 210) according to the invention. The part covered in this way is exposed to a 1100° C. flame corresponding to an energy flow of $120 \cdot 10^3$ $W*m^{-2}$ for 15 minutes and vibration with imposed movement with amplitude 0.4 mm at a frequency of 50 Hz:

the thermal protection is not perforated;

the temperature of the part remains below 500° C. after 5 minutes of exposure and below 700° C. after 10 minutes of exposure; and above all, in a part (100) made of a composite with carbon fiber reinforcement in a phenolic matrix, the self-ignition temperature is not reached during the matrix degassing phase.

Thus, the device according to the invention provides thermal protection compatible with applicable aerospace standards, with an added mass that is 25% less than the known solutions of the prior art.

The device and method according to the invention are more particularly advantageous for making thermal protection for a structural part made of composite material with a polymer matrix. However, the device and method according to the invention are also adapted for making thermal protection for a structural part made of other material.

The invention claimed is:

1. A method to fireproof a section of a structural part made of composite material using a device comprising:
    a skin comprising an outer surface configured to face a flame and an inner surface, the skin is made of composite material that comprises fibrous reinforcement in a polymer matrix comprising a ply made of glass fabric on the inner surface of the skin and comprises a fastener to fasten the skin to the structural part; and
    a layer of needled fire retardant felt placed between the inner surface of the skin and a surface of the structural part:
    the method comprising the steps of:
    (i) laying up a ply of non-impregnated glass on a tool corresponding to a shape of a section of the structural part, offset by a thickness of the fire retardant felt, wherein the ply of non-impregnated glass forms the inner surface of the skin;
    (ii) laying up a ply of pre-impregnated glass on the ply of non-impregnated glass to form a laminate;
    (iii) curing the laminate so as to form the skin;
    (iv) placing a thickness of fire retardant felt on the inner surface of the skin;
    (v) fixing the skin to a corresponding section of the structural part; and
    repeating steps (i) to (v) for each section of the structural part until the structural part is covered.

2. The method according to claim 1, wherein step (v) of fixing the skin comprises a riveting operation which comprise applying thermal protection of an ablative or intumescent type on rivet heads.

3. The method according to claim 1, wherein the fire retardant felt is 10 mm thick.

* * * * *